United States Patent
Zandvliet et al.

(12) 
(10) Patent No.: US 6,601,409 B1
(45) Date of Patent: Aug. 5, 2003

(54) METHOD FOR MANUFACTURING SUCCESSIVE SPHERICAL GLASS ARTICLES WITH FIGURINES ACCOMMODATED THEREIN, AND ARTICLES OBTAINED WITH THE METHOD

(75) Inventors: Johannes Maria Zandvliet, Wassenaar (NL); René Cornelis Malherbe de Juvigny, Vleuten (NL)

(73) Assignee: Marbleous World B.V., Wassenaar (NL)

( * ) Notice: Subject to any disclaimer, the term of this patent is extended or adjusted under 35 U.S.C. 154(b) by 0 days.

(21) Appl. No.: 09/380,240

(22) PCT Filed: Dec. 29, 1998

(86) PCT No.: PCT/NL98/00743

§ 371 (c)(1),
(2), (4) Date: Nov. 10, 1999

(87) PCT Pub. No.: WO99/33754

PCT Pub. Date: Jul. 8, 1999

(30) Foreign Application Priority Data

Dec. 30, 1997 (NL) .............................................. 1007932

(51) Int. Cl.[7] .......................... C03B 17/00; C03B 13/14
(52) U.S. Cl. ..................................... 65/48; 65/DIG. 11
(58) Field of Search ......................... 65/DIG. 11, 21.3, 65/32.1, 32.2, 41, 43, 48, 56, 126, 127, 143

(56) References Cited

U.S. PATENT DOCUMENTS

| | | | | |
|---|---|---|---|---|
| 1,730,257 A | * | 10/1929 | Welch ............................ | 65/32 |
| 1,889,390 A | | 11/1932 | Throm | |
| 2,350,421 A | * | 6/1944 | Schoder et al. .............. | 264/255 |
| 2,371,213 A | * | 3/1945 | Batchell ........................ | 65/335 |
| 3,350,186 A | * | 10/1967 | Meinhard ....................... | 65/36 |
| 3,392,312 A | * | 7/1968 | Carman ....................... | 257/794 |
| 3,493,405 A | * | 2/1970 | Thomas ......................... | 501/61 |
| 3,664,786 A | * | 5/1972 | Devine ........................... | 425/99 |
| 4,116,439 A | * | 9/1978 | Chavarria et al. ........... | 264/245 |
| 4,278,626 A | * | 7/1981 | Atanasovski ................ | 264/40.1 |
| 4,584,212 A | * | 4/1986 | Klein et al. .................... | 428/13 |
| 5,855,640 A | * | 1/1999 | Scott et al. ................... | 600/374 |
| 5,895,512 A | * | 4/1999 | Dominitz et al. ............. | 65/59.6 |
| 5,914,438 A | * | 6/1999 | Scott et al. ..................... | 65/121 |
| 6,060,011 A | * | 5/2000 | Zandvliet et al. ............ | 264/275 |

FOREIGN PATENT DOCUMENTS

| | | |
|---|---|---|
| FR | 2459786 | 6/1981 |
| FR | 2698200 | 11/1994 |
| WO | 9725282 | 7/1997 |

OTHER PUBLICATIONS

Hollister Jr., Paul, "Sulphides", The Encyclopedia of Glass Paperweights, Paperweight Press, pp. 254–267, 1969 (no month available).*

Block, Robert, "Sulphide", Marbles: Identification and Price Guide, Schiffer Publishing, pp. 56–59, 1996 (no month available).*

Luscomb, Sally C., "The Collectors Encyclopedia of Buttons," Schiffer Publishing, p. 84, 1992 (no month available).*

* cited by examiner

Primary Examiner—Sean Vincent
(74) Attorney, Agent, or Firm—Webb Ziesenheim Logsdon Orkin & Hanson, P.C.

(57) ABSTRACT

The invention relates to a method of manufacturing successive spherical glass articles, in each of which is accommodated a three-dimensional object of figuring, which method comprises the following steps, to be performed in a suitable sequence, of: (a) providing a container with a mass of molten glass, which container comprises a discharge opening through which liquid glass can be delivered; (b) providing thermally resistant figurines; (c) wholly enclosing successively at least one figurine by molten glass by feeding molten glass thereto from at least two sides; (d) portioning the molten glass before or after step (c) such that molten glass masses are formed, in each of which a figurine is embedded; and (e) modelling these masses to a spherical form by substantially omnidirectional rolling for a time with simultaneous cooling so that the glass solidifies.

7 Claims, 12 Drawing Sheets

METHOD FOR MANUFACTURING SUCCESSIVE SPHERICAL GLASS ARTICLES WITH FIGURINES ACCOMMODATED THEREIN, AND ARTICLES OBTAINED WITH THE METHOD

BACKGROUND OF THE INVENTION

The invention relates to the manufacture of spherical glass objects, in each of which a three-dimensional object is accommodated. A method of this type is known in many embodiments.

SUMMARY OF THE INVENTION

It is an object of the invention to design a method such that a very large production speed on industrial scale can be realized wherein the obtained spherical glass articles nevertheless comply with very high technical standards.

It is a further object of the invention to provide a method with which the mass production can take place at very low cost.

The invention generally provides a method of manufacturing successive spherical glass articles, in each of which is accommodated a three-dimensional object or figurine, which method comprises the following steps, to be performed in a suitable sequence, of:

(a) providing a container with a mass of molten glass, which container comprises a discharge opening through which liquid glass can be delivered;

(b) providing thermally resistant figurines;

(c) wholly enclosing successively at least one figurine by molten glass by feeding molten glass thereto from at least two sides; (d) portioning the molten glass before or after step (c) such that molten glass masses are formed, in each of which a figurine is embedded; and (e) modelling these masses to a spherical form by substantially omnidirectional rolling for a time with simultaneous cooling so that the glass solidifies.

In such a method the problem may occur that air is enclosed in the zone in which the glass masses fed from at least two sides make mutually contact. As a result of the great viscosity of the glass, air or other gas inclusion is no longer able to escape. Air bubbles or other gas inclusions affect to a considerable degree the aesthetic quality of the product for manufacture. It is therefore desirable to perform the method according to the invention such that there is no or only negligible danger of air inclusions. In this respect the method according to the invention can preferably comprise step (f) performing step (c) substantially in the absence of a gas which cannot dissolve in molten glass, such that gas inclusions, for instance air bubbles, are prevented.

A specific embodiment comprises step (g) performing step (f) in a gaseous environment under substantial underpressure.

An alternative embodiment of the method comprises step (h) performing step (f) in the presence of a gas which can dissolve in molten glass, for instance hydrogen, helium, neon, argon.

In order to prevent thermal stresses, the embodiment of the method is recommended which comprises step (i) performing step (c) after pre-heating the successive figurines, for instance to a temperature in the order of 850° C.

A specific embodiment has the special feature that step (e) is performed by means of a first roller in which is recessed a helical groove with a smooth round form, which roller is driven rotatably at a first peripheral speed and co-acts with a second roller driven at a second peripheral speed differing from the first peripheral speed, which second roller is smooth or likewise provided with a helical groove.

A specific embodiment has the special feature that the glass substantially consists of the following constituents:

c. 76% $SiO_2$
c. 16% $Na_2O$
c. 6% $CaO$
c. 2% $K_2O$.

A preferred embodiment has the special feature that each figurine is provided beforehand with a glaze coating comprising at least one oxide from the group of which Si, Al, Na, Mg, Zr form part, with colouring pigments on the basis of elements from the group of which Fe, Pb, Cr form part.

A specific embodiment has the special feature that the glazing of the figurines consists substantially of the following constituents:

61.5% $SiO_2$
14.7% $AL_2O_3$
4.7% $Na_2O$
6.6% $K_2O$
11.2% $CaO$
1.3% rest

A specific embodiment of the method according to the invention is herein characterized in that the material of the figurines contains the following constituents:

c. 65% $SiO_2$
c. 19% $AL_2O_3$
c. 1.9% $Na_2O$
c. 4.2% $MgO$
c. 6.4% $CaO$

A specific embodiment has the special feature that the material of the figurines consists substantially of a ceramic mass, for instance kaolin (china clay), pipe clay or the like.

It should be understood that the material must be modelled beforehand until it has obtained the desired three-dimensional form. The material can for instance be wetted in powder form, thus resulting in a certain cohesion. A first cohesion is then obtained by a pre-heating, which can take place in a manner to be described below. Only after embedding in the still red-hot plastic glass mass does a definitive hardening of the figurines takes place.

A specific embodiment has the special feature that the material of the figurines contains at least approximately the following constituents:

61.0% $SiO_2$
21.0% $AL_2O_3$
1.0% $FE_2O_3$
1.2% $CaO$
0.5% $MgO$
0.2% $Na_2O$
2.0% $K_2O$

A variant has the special feature that the material of the figurines contains at least approximately the following constituents:

62.0% $SiO_2$
2.0% $AL_2O_3$
1.1% $FE_2O_3$ 0.5% CaO
32.0% MgO
0.7% Na$_2$O
1.0% K$_2$O

In order to avoid thermal stresses, the method according to the invention is preferably performed such that cooling of the spherical articles takes place by progressing through the temperature path from the annealing temperature to the strain temperature at a chosen speed such that cooling takes place in substantially stress-free manner.

The invention further relates to a method which comprises step (j) annealing after step (e) by again fully heating the spherical glass articles to remove internal stresses and subsequently cooling slowly to for instance about 50° C.

A further variant of the method according to the invention comprises the following steps or:

(k) dividing the molten glass delivered via the discharge opening into successive portions;

(l) providing a mould with at least roughly hemispherical bottom and an at least roughly hemispherical cover for placing thereon and removing therefrom;

(m) pouring a first portion of glass onto the bottom;

(n) placing at least one figurine on and optionally partially in this first portion of glass;

(o) pouring a second portion of glass onto the first portion of glass and the figurine;

(p) placing the cover while pressing the thus enclosed mass;

(q) removing the cover;

(r) removing the formed, at least more or less spherical glass mass with figurine enclosed therein; and (s) performing step (e).

In yet another embodiment the invention provides a method of manufacturing successive spherical glass articles, in each of which is accommodated a figurine, which method comprises the following steps of:

(t) providing a container with a mass of molten glass, which container comprises a discharge opening which can be closed by a valve and into which a vertical tubular central mandrel extends such that a tubular flow of liquid glass can be delivered via the discharge opening;

(u) opening the valve for delivering said flow of liquid glass while simultaneously supplying successive figurines intermittently via the mandrel such that these objects are received in the hollow space of the glass flow;

(v) causing the glass flow to contract and thus embedding the successive objects in the glass mass;

(w) successively separating the lower part of the glass flow in which a figurine is situated such that still molten glass masses are formed, in each of which a figurine is embedded; and (e) modelling these masses to a spherical form by substantially omnidirectional rolling with simultaneous cooling so that the glass solidifies.

A preferred embodiment has the special feature that the mandrel has a widened lower part which can co-act as valve body with the mouth edge of the discharge opening serving as valve seat.

Yet another embodiment is characterized in that step (c) takes place using a number of concave rollers together bounding a round passage opening.

In some conditions this latter embodiment can advantageously have the special feature that the rollers are driven at an increased peripheral speed reinforcing the contraction of the glass flow. It is noted herein that the rollers in this case have a "pulling" function. An effective stretching of the glass flow hereby occurs. In the case where the rollers are driven at a relatively low speed or are slowed down relative to the driving glass flow, a certain expansion occurs upstream relative to the rollers, followed by a contraction as a result of the relatively narrow passage opening defined by the co-acting rollers.

A specific embodiment has the special feature that the rollers have partly spherical cavities co-acting in register positions during rotation.

A practical embodiment has the special feature that step (v) is performed by cutting through the glass flow between the figurines.

This latter embodiment can advantageously be performed such that use is made of two plates with co-acting, generally concave, substantially V-shaped cutting edges.

As already described above, the figurines are preferably pre-heated prior to embedding. The possibility is also described of making use of a mandrel extending through the discharge opening of the glass container. In this embodiment the figurines can be pre-heated simply by making use of a chosen residence time of each figurine in the tubular cavity defined by the mandrel.

Said compositions of glass, figurines and glazing have a number of advantages, particularly in combination with each other. It may for instance be important for the figurines and the glass to have substantially the same thermal coefficient of expansion. This is realized with sufficient precision with the described compositions so that thermal stresses are prevented. The colour-fastness of the glazing must further comply with high standards. These are also fulfilled with the described composition of the glazing.

Finally, the invention relates to a spherical glass article in which a three-dimensional object is embedded, which spherical article with the three-dimensional object embedded therein is manufactured by applying one of the above described methods.

It should be understood that more than one figurine can be embedded in a glass mass. The figurine can be thermally resistant in a manner such that form and colour are wholly retained despite the very high temperature of the glass. Ceramic materials for instance are very suitable in this respect. A glass figurine or a combination of a number of glass figurines can also be envisaged which fuse together to a greater or lesser degree with the encapsulating glass during embedding In this embodiment the contours of the figurine(s) in the finished product are less sharp than in the first described embodiment with for instance a ceramic figurine.

BRIEF DESCRIPTION OF THE DRAWINGS

The invention will now be elucidated with reference to the annexed drawings. Herein.

DESCRIPTION OF THE PREFERRED EMBODIMENTS

Figure 1:
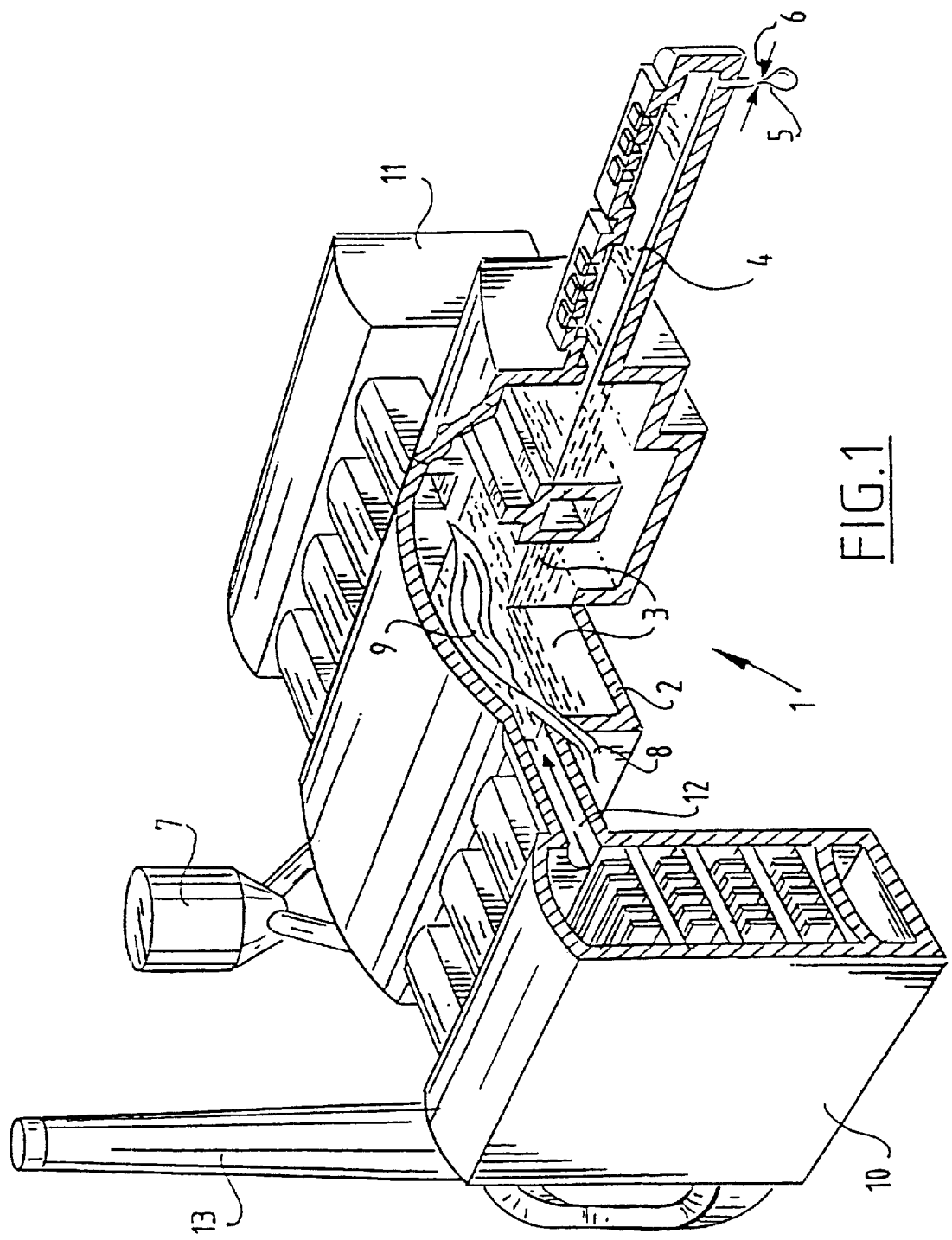
FIG. 1 shows a highly schematic cut-away perspective view of a continuously operating glass furnace.

FIG. 1 shows a continuously operating glass furnace 1. The basin 2 contains a mass of molten glass 3 which is fed in a manner to be described hereinbelow via a so-called feeder 4 to a glass discharge 5 to which a cutting device 6 is added in a manner to be described hereinbelow.

A raw material silo 7 connects onto basin 2. Heating takes place via fuel supply pipes 8 which heat glass mass 4 from above, as symbolically designated with flames 9. Connecting onto basin 3 in per se known manner are regenerators 10, 11 which in successive alternation store heat and supply combustion air 11 to burners 8. Owing to the alternation of the flow direction and the alternating direction of flames 9, respectively in the shown direction from regenerator 10 to regenerator 11 and from regenerator 11 to regenerator 12, an effective heat storage in the receiving generator takes place, which stored heat can be used to pre-heat the combustion air used for the burners. A very high efficiency is hereby obtained. A chimney 13 serves for discharge of the combustion gases.

The invention relates in particular to the structure in the vicinity of glass discharge 5.

Figure 2:
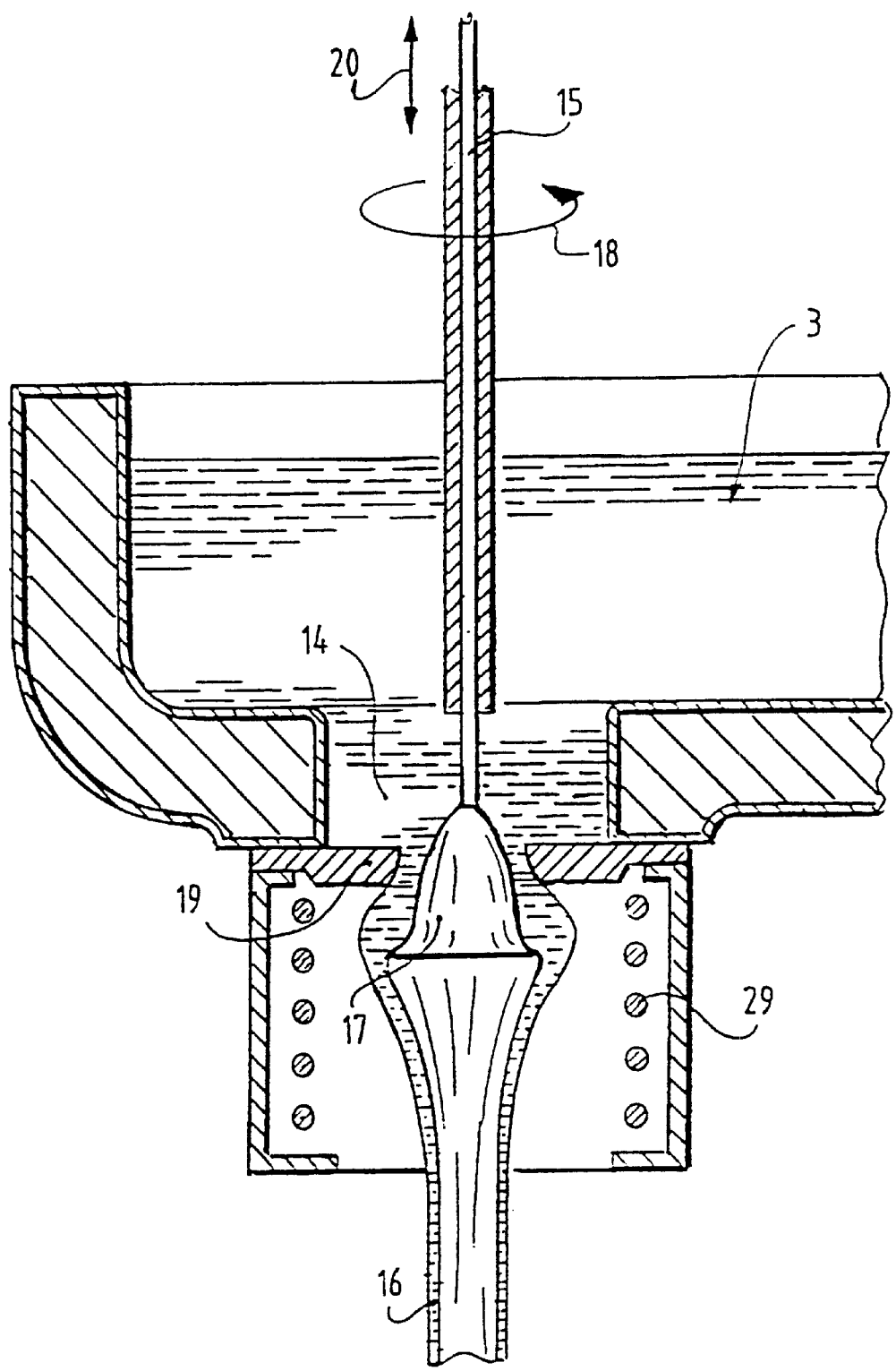
FIG. 2 shows a schematic cross-section through a glass discharge in which a central mandrel is received.

FIG. 2 shows that the glass mass 3 can be delivered via a discharge channel 14. Owing to the presence of a central tubular mandrel 15 the glass is delivered in a tubular flow 16 which is subjected in natural manner to a certain contraction as a result of the force of gravity. It should be understood, that at the moment it leaves discharge channel 14 the glass has a temperature in the order of 1100° C. and is therefore red-hot to orange-hot and completely plastic.

Central mandrel 15 has a widened lower part 17. Mandrel 15 can also be driven rotatingly in per se known manner as is designated symbolically with arrow 18. Since the discharge channel is provided on its underside with an internal flange 19, the shape of which is adapted to the shape of the widened part 17 of mandrel 15, the widened part 17 of mandrel 15 can, by moving the mandrel up and down as according to arrow 20, co-act as a valve body with the flange part 19 serving as valve seat. Glass flow 16 can hereby be controlled as desired.

Figure 3:
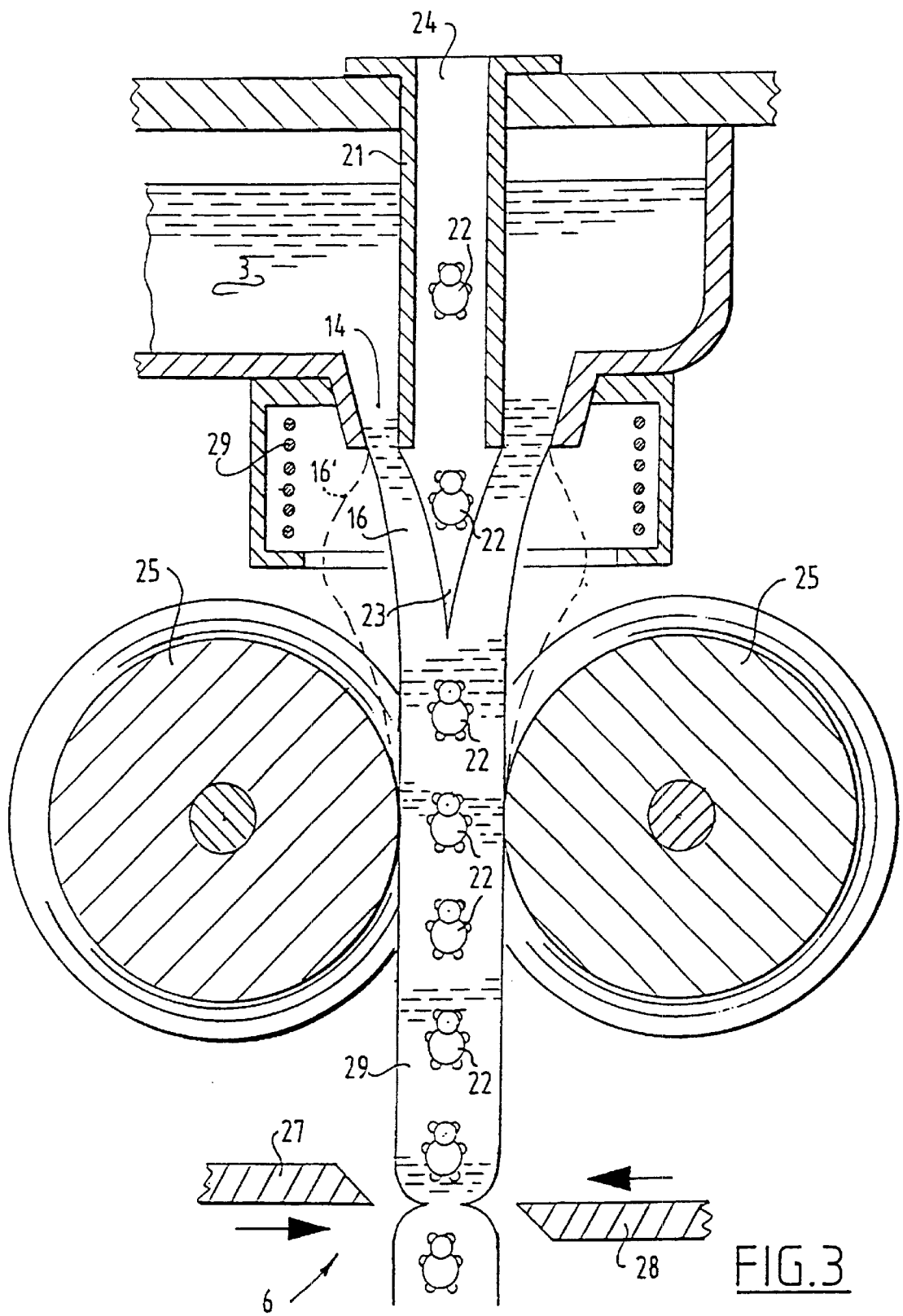
FIG. 3 shows a schematic cross-section through an alternative embodiment of a glass discharge, to which heating means and contraction rollers are added.

FIG. 3 shows an embodiment in which a relatively wide mandrel 21 is used. Into this hollow mandrel the three-dimensional objects or figurines for embedding and preferably embodied in ceramic material can be lowered from the top such that they come to lie in pinch 23 of the tubular glass flow 16. With suitable timing in combination with the contraction process to be described hereinbelow the figurines 22 acquire a determined regular mutual spacing. It is noted that the generally still untreated figurines 22 can be pre-heated during the stay in the cavity 24 inside mandrel 21 such that they are as it were pre-baked and acquire a certain cohesion. Owing to this heating the temperature difference between objects 22 and glass flow 16 is limited at the moment of contact, whereby thermal stresses remain within certain limits.

Figure 3A:
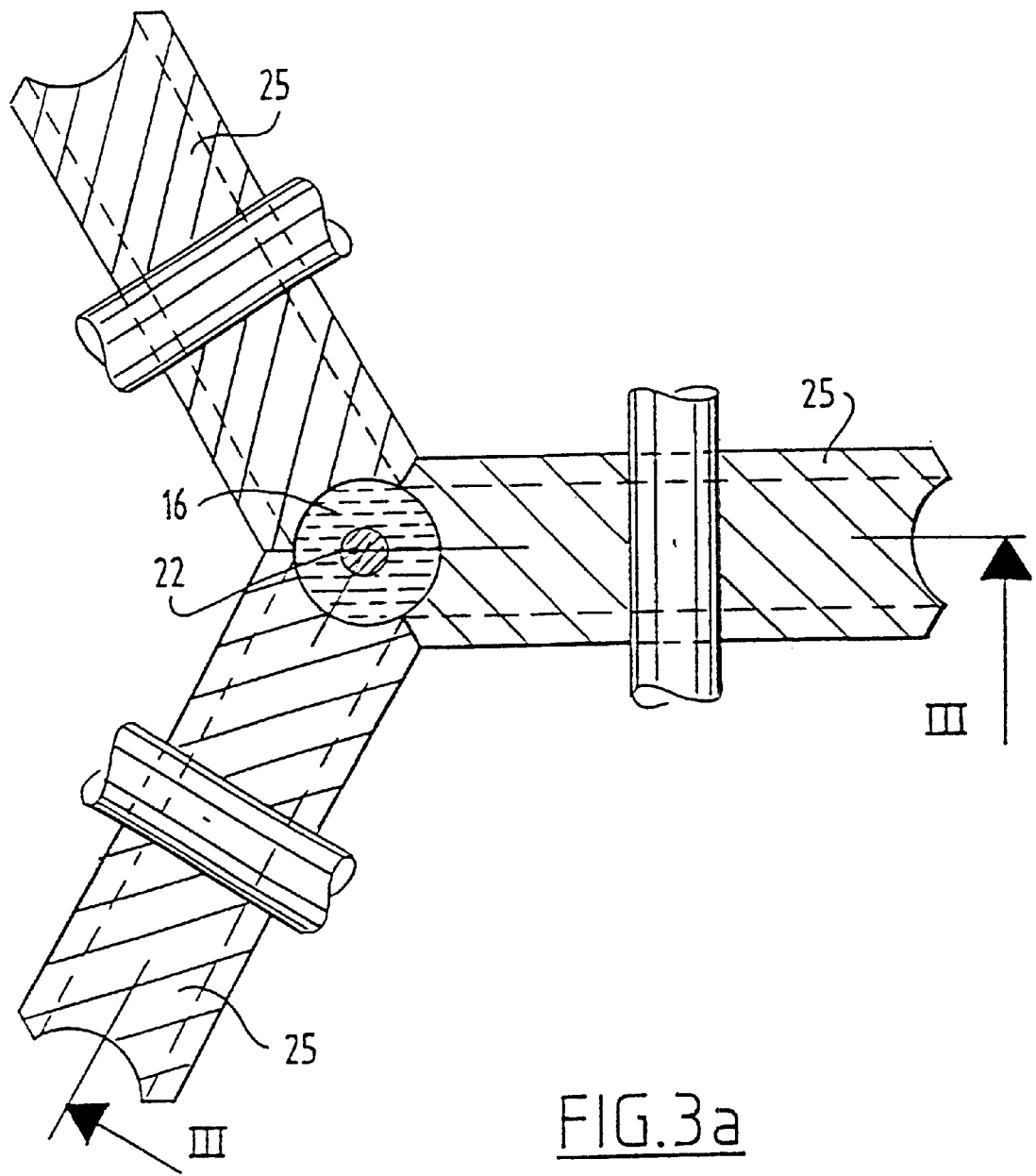
FIG. 3a shows a schematic cross-section through the contraction and modelling rollers.
Figure 3B:
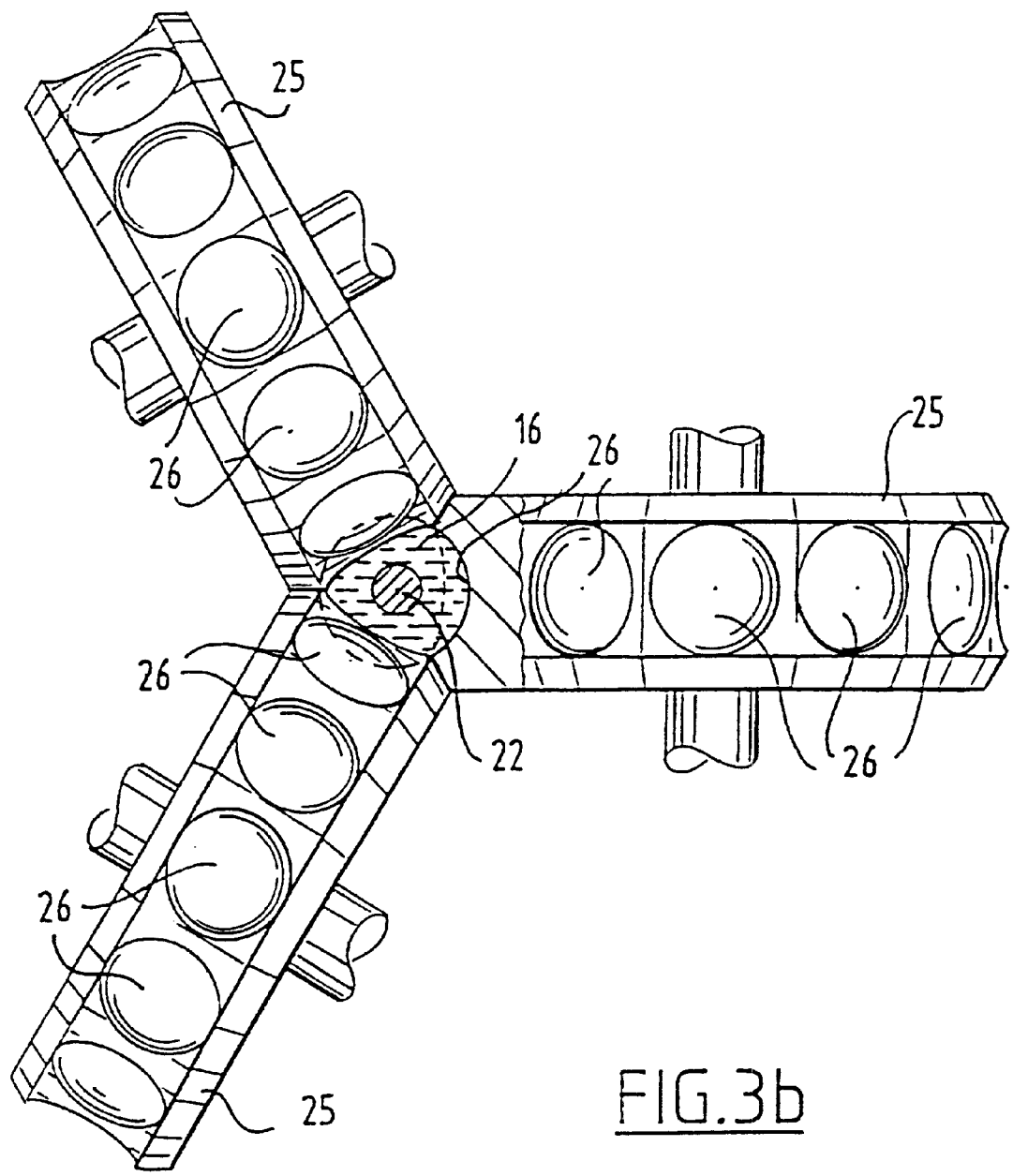
FIG. 3b shows a top view of alternative rollers which are provided with hemispherical recesses.

Downstream of pinch 23 an additional forced contraction of the glass flow takes place by using for instance three modelling rollers 25 which have in cross-section for instance the form shown in FIG. 3a. By moving the structure of FIG. 3a to the centre a limited, wholly round passage is realized which is bounded by the rotatably driven rollers. Alternatively, the rollers can also be provided as according to FIG. 3b with shallow, half-round cavities 26.

Downstream of rollers 25 the glass flow 29 is severed between the embedded objects 22 by means of two knives 27, 28 for moving towards each other.

Depending on the speed at which rollers 25 rotate, an effective contraction of glass flow 16 can occur or a certain expansion can first occur as designated with 16'.

A heating element 29 is situated in the area of the opening of through-feed channel 14.

Figure 4:
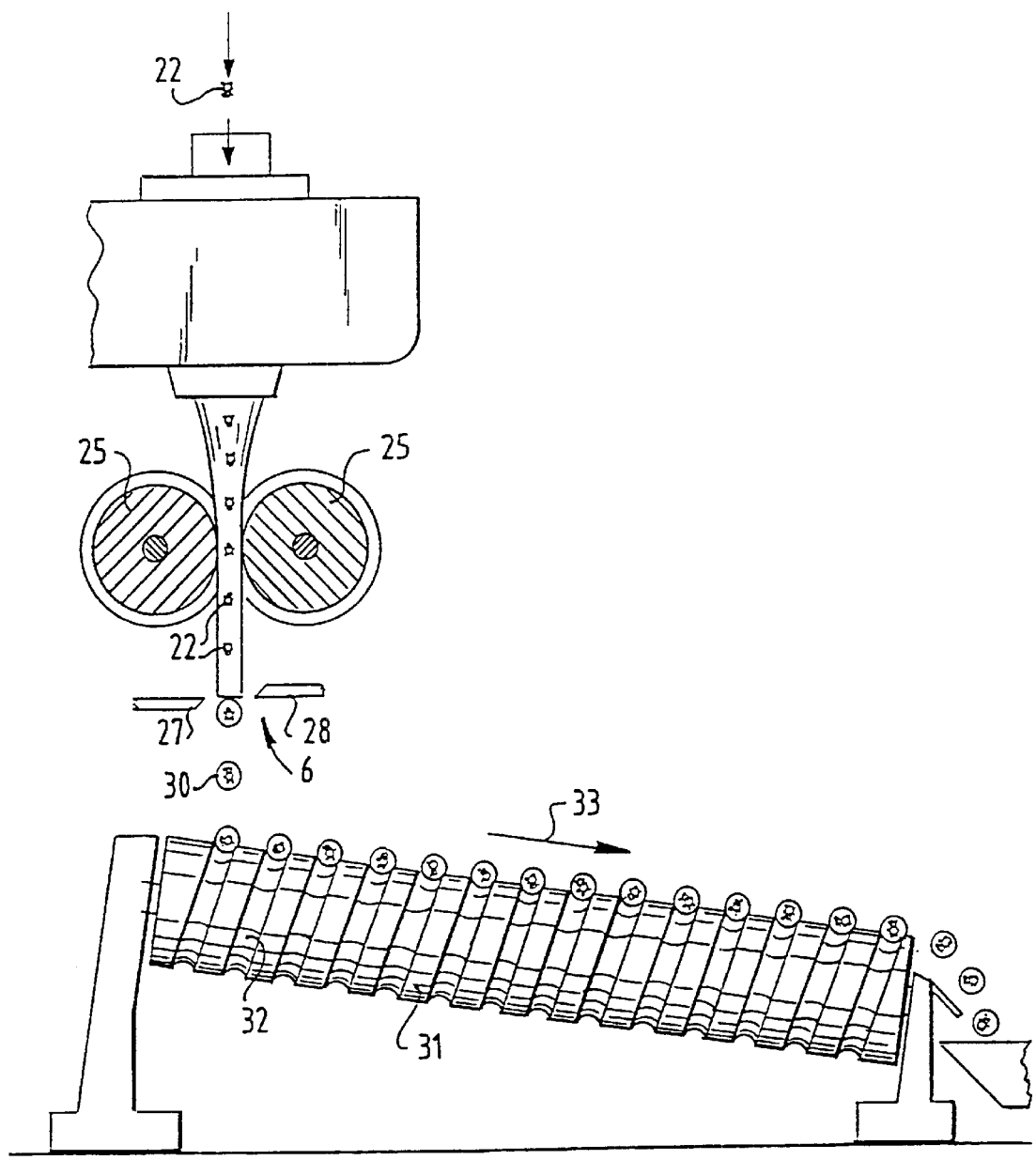
FIG. 4 is a schematic side view of the discharge arrangement according to FIG. 3 with a device connecting thereto for rolling the glass masses into spherical articles.

FIG. 4 shows that after leaving cutting device 6 consisting of knives 27, 28, the still plastic masses 30 are received by a roller 31 which is driven rotatably by means which are not drawn and which is provided with a half-round helical groove 32. As a result of the rotating drive of roller 31 the articles 30 roll downward as according to arrow 33 while being guided by guide means (not drawn) and leave roller 31 in still hot but at least solidified state.

Three parameters are important for stress-free cooling or "annealing" of the glass.

The annealing temperature $T_a$: below this temperature the thermal stresses present equalize within about 15 minutes through viscous relaxation. In order to make the glass stress-free, the product must therefore be heated to just above $T_a$ and then cooled slowly.

The strain temperature $T_s$: below this temperature internal stresses virtually no longer equalize (at $T_s$ the equalization period is about 15 hours).

The cooling speed (v): during cooling of products it is necessary to progress through the path $T_a$ to $T_s$ slowly in order to avoid stress build-up due to temperature gradients.

Both said temperatures are dependent on the composition of the glass, while (v) depends on the form and geometry of the product. For the composition of the glass as according to the appended claim 10, in which the values are shown in percentages by weight, the following temperatures can be calculated:

$T_a$=505° C.

$T_s$=187° C.

For this type of glass an annealing progression of about 40° C. was used, i.e. 520° C.–480° C.

The cooling speeds for the glass articles to be manufactured with the method according to the invention are dependent on the diameters:

diameter=22 mm: v=6° C./m diameter=35 mm: v=2.4° C./m

Permanent stresses in the glass can be prevented by cooling according to these speeds between 520 and 480° C.

It should be taken into consideration here that below $T_s$ temporary stress can still develop in the glass due to rapid cooling. These stresses can be prevented, again depending on the diameter of the spherical article, by a controlled cooling to room temperature. Indicative cooling speeds for this purpose are:

diameter=22 mm: v=10° C./m
diameter=35 mm: v=5° C./m

It should therefore be understood that heating must first take place if necessary to $T_a$, whereafter a period of 15 minutes is reserved in order to arrive at a stress-free state. An annealing treatment then takes place in accordance with the specification given above, whereafter a controlled cooling to room temperature finally takes place in accordance with the cooling speeds given above.

The cooling progression immediately after forming of the glass at temperatures above 1000° C. to said temperature of about 520° C. is not of great significance in the occurrence of stresses in the end products. It is the final cooling progression below 520° C. which is the main concern in practice, wherein a separate heat 15 treatment, annealing between 520° C. and 480° C., is also necessary.

The influence of the inserted figurine generally consisting of ceramic material is not wholly predictable. It may however be anticipated that, particularly when there is substantial pre-heating, no problems will occur, assuming that said cooling speeds are observed.

Figure 5:
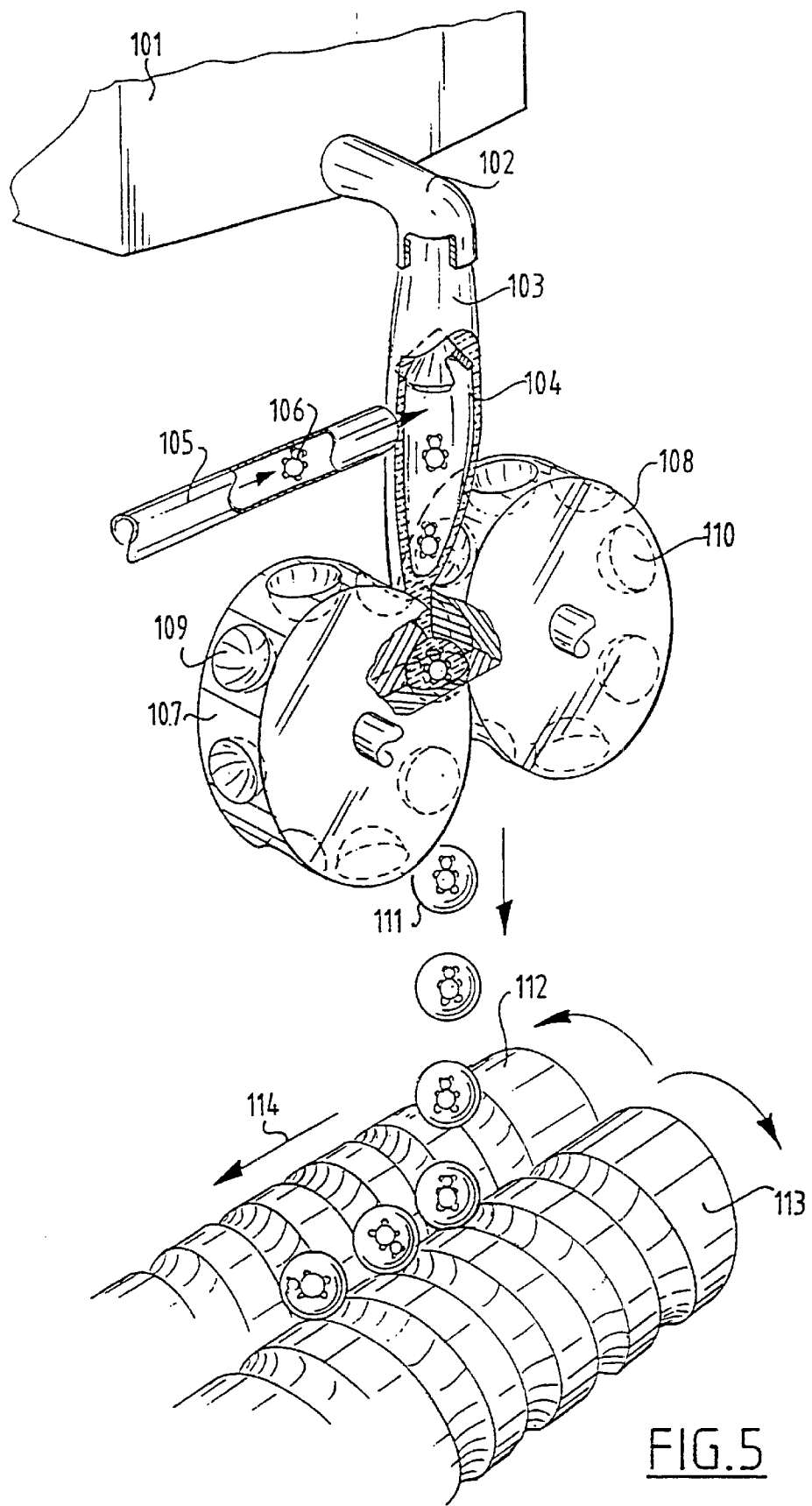
FIG. 5 shows a partly broken-away perspective view or a variant of the device according to FIG. 4.
Figure 6:
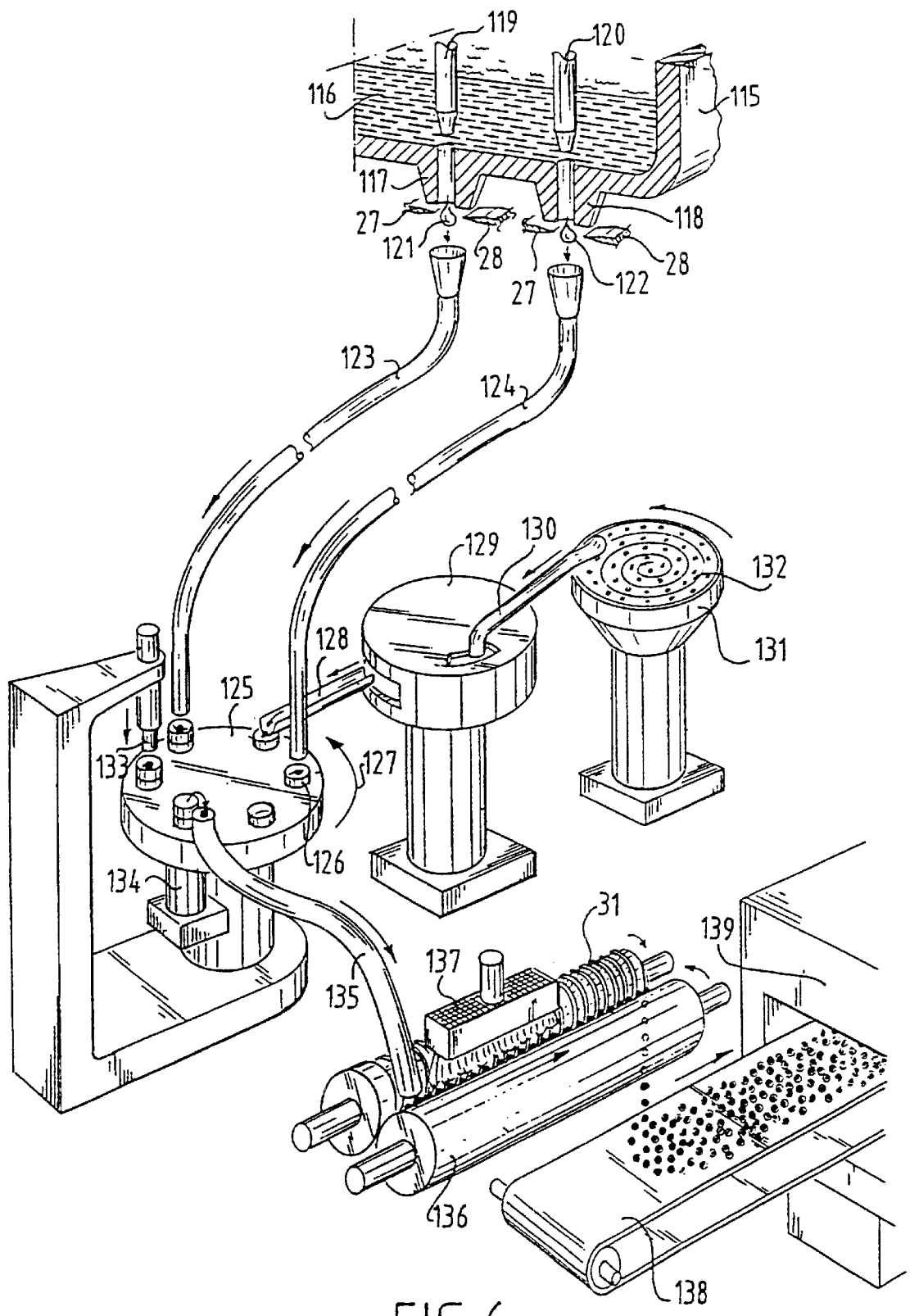
FIG. 6 shows a partly broken-away perspective schematic view of a complete installation adapted to manufacture glass marbles with a figurine accommodated therein.

Attention is drawn to the fact that for the sake of clarity in the drawing the second roller which co-acts with roller 31 is not drawn in FIG. 4. Reference is made in this respect to FIGS. 5 and 6 in which two different possibilities are shown in more detail.

FIG. 5 shows a container 101 for liquid gas onto which connects a discharge 102. A glass flow 103 flows downwards herethrough. Glass flow 103 is guided round a hollow mandrel 104 onto which connects a feed 105 for figurines 106. The figurines are discharged into the pinch of rollers 107, 108 such that the figurines 106 are wholly embedded by liquid gas at that position owing to the contraction of glass flow 103. As is shown, rollers 107, 108 are provided with substantially hemispherical cavities 109, 110 respectively, wherein rollers 107, 108 are driven such that the respective cavities, positioned in register in each case, together define a sphere. The supply of figurines 106 is further synchronized with the successive forming in each case of said spherical shape by cavities 109, 110. Thus is ensured that a figurine 106 is always accommodated in the centre of a glass sphere 111. After leaving the pinch between rollers 107, 108 the still plastic glass articles 111 each with a figurine 106 therein drop onto two profiled rollers 112, 113, which are each provided with a more or less semi-cylindrical, helically extending recess. In this embodiment the rollers 112, 113 are rotated in opposite direction relative to one another, whereby articles 111 are transported as according to arrow 114 to then be subjected to a final processing, as will be elucidated hereinbelow with reference to FIG. 6. The rollers can also rotate in the same direction. The pitch of the groove must then be in opposite direction.

FIG. 6 shows a container 115 with liquid glass 116. The container has two discharges 117, 118 and two plungers 119, 120 which are movable up and downward under the control of a central control unit and which can deliver in pulsating manner one droplet of glass respectively 121, 122 at a time via discharges 117, 118. For the sake of clarity FIG. 6 also shows as alternative that the glass flow can be portioned by making use of cutting knives 27, 28 (compare FIG. 3). The droplets or portions of glass 121, 122 are carried at points in time to be described hereinafter to a turntable or carrousel 125 via conduits 123, 124. The carrousel rotates intermittently through angles of 60°. Six bottoms of moulds are placed angularly equidistant on the carrousel. The relevant bottoms are designated with 126 in FIGS. 7, 8, 9, 10, 11, 12. Carrousel 125 is drivable for intermittent rotation in the direction of an arrow 127. In the drawn position a bottom 126 is filled via conduit 124 with a plastic glass droplet 122. A step of 60° then takes place whereby a position is reached at which a figurine is discharged onto and partly into the plastic glass mass via a chute 128. The figurine is delivered by a heating device 129, where a heating to for instance 850° C. takes place. The infeed tube 130 of heating device 129 connects onto a discharge device 31 with a spiral-shaped vibrating chute 132.

A subsequent step of 60° then takes place to a following position. In this position a droplet 121 is poured via conduit 123 onto the figurine and the already present glass filling on the bottom.

Carrousel 125 is then again rotated through a distance of 60° to a position where a cover or stamp 133 closes the bottom in the manner of a mould and the glass article acquires a general spherical shape. The stamp is raised again and carrousel 125 further rotated through 60° to the position of an ejecting mechanism 134 which carries the formed, generally spherical article to a discharge tube 135 by ejection from below. Not shown is that additional directional provisions can for instance be applied for this purpose, for instance an airflow, a pusher or the like (see FIG. 11 and 12).

Situated at the end of discharge conduit 135 are roller 31 and a non-profiled, generally cylindrical roller 136 which co-acts therewith and which is driven at a different speed.

Above roller 31 is situated a burner 137 which serves for so-called "fire-polishing" of the formed glass articles. A temporary heating hereby takes place which facilitates the precise modelling of the spherical glass articles to a spherical shape. Downstream of burner 137 a cooling takes place such that the glass articles with the figurines enclosed therein solidify completely and can be tipped at the end onto an endless conveyor belt 138 to be carried through a thermal treatment device 139. A reheating to the core of the articles herein takes place first, followed by a very gradual cooling. Thus is ensured that the obtained articles are essentially free of thermal stresses.

FIGS. 7–12 show in more detail the structure in the region of carrousel 125.

The figures show the respective stations corresponding with the described six positions.

Figure 7:
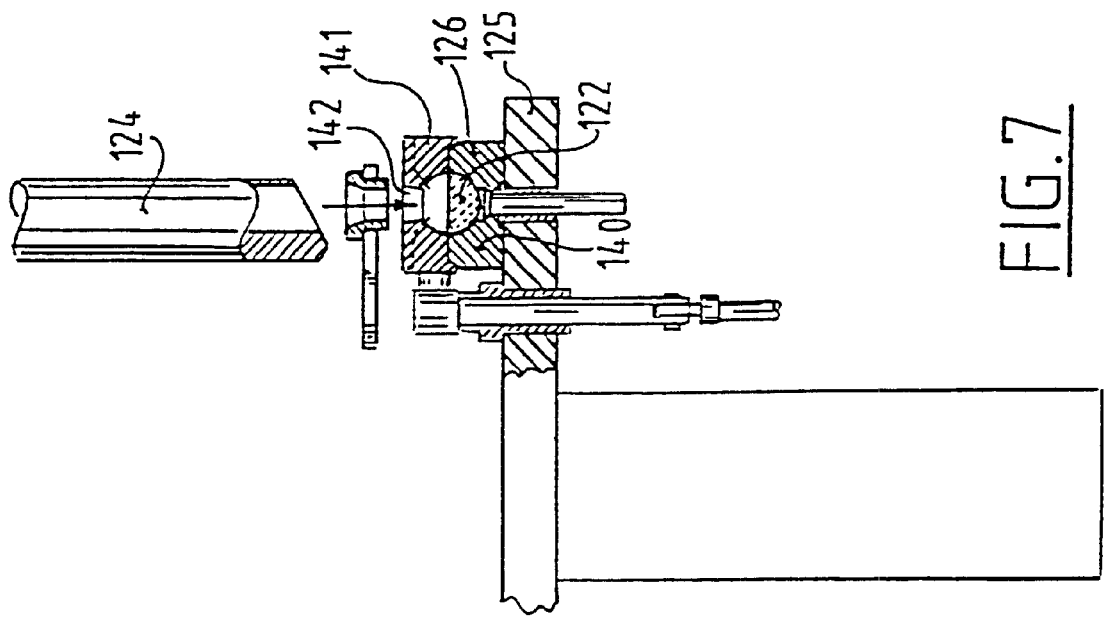

FIG. 7 shows the situation in which a droplet 122 is poured via conduit 124 onto the bottom 126. The bottom consists of two parts, i.e. a hemispherical lower part 140 and an upper correspondingly formed part 141 with an opening 142.

Figure 8:
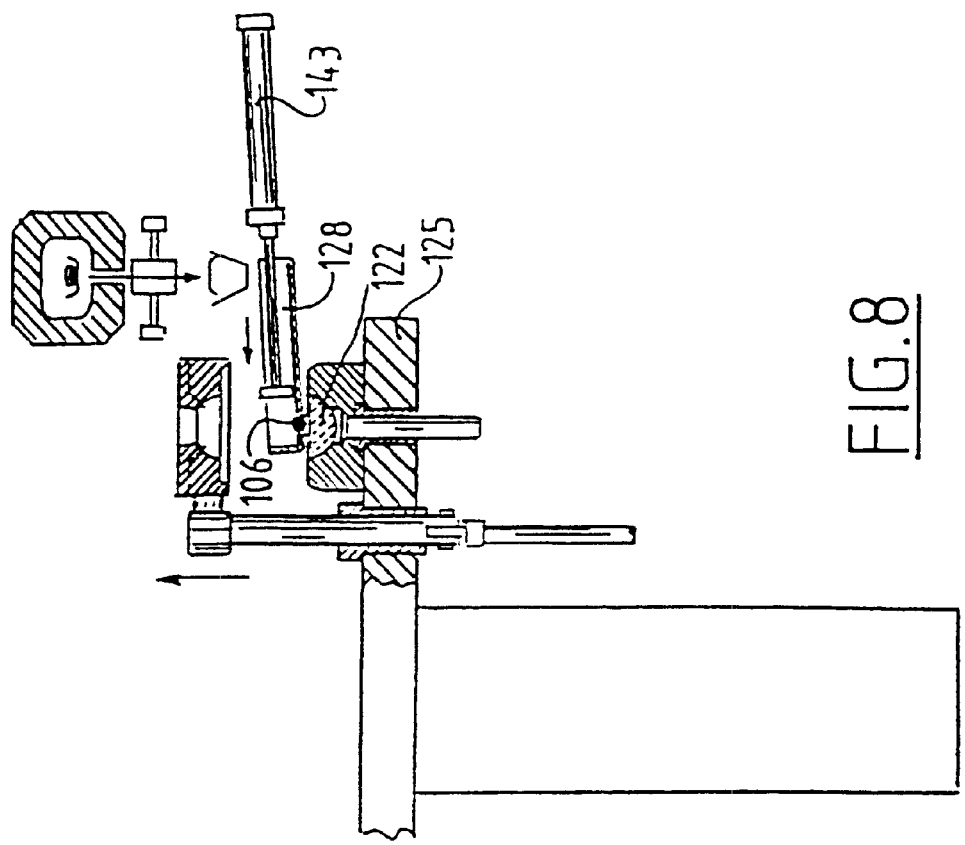
FIGS. 7, 8, 9, 10, 11, 12 show cross-sections through the processing station of the device according to FIG. 6 where successive figurines are embedded in a glass mass.

FIG. 8 shows the situation in which a figurine 106 is placed by means of a pick and place unit 143.

Figure 9:
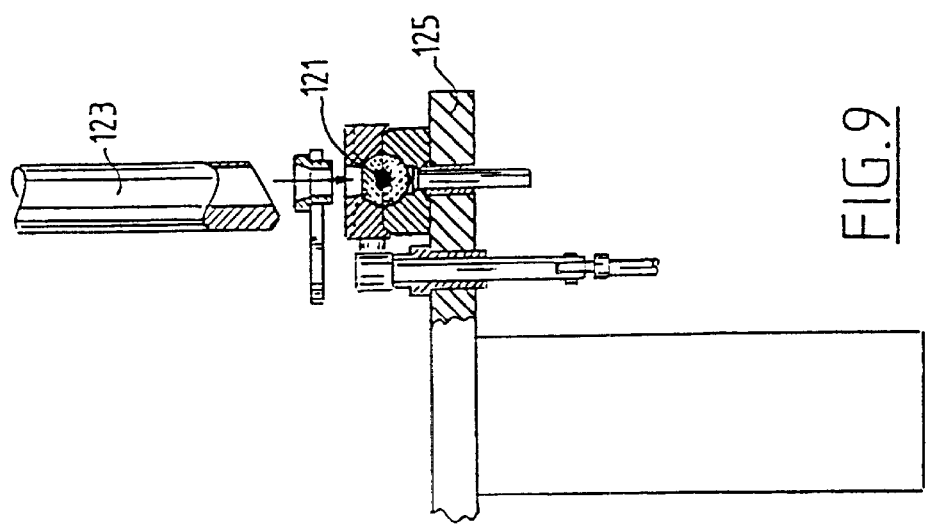

FIG. 9 shows the situation in which a glass mass 121 is poured onto the figurine via conduit 123.

Figure 10:
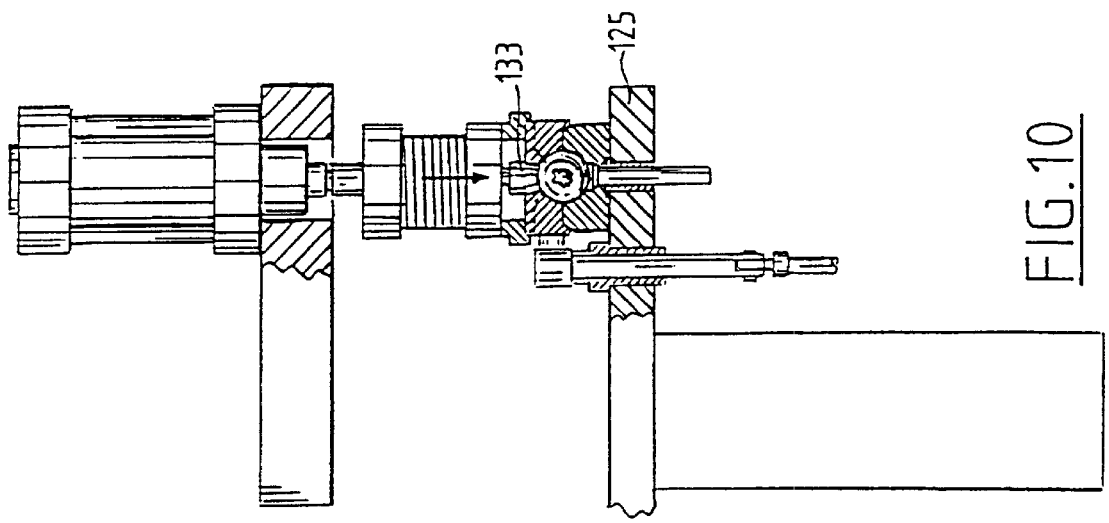

FIG. 10 shows the situation in which press 133 completes the spherical shape under pressure to form a spherical plastic glass mass with a figurine enclosed therein.

Figure 11:
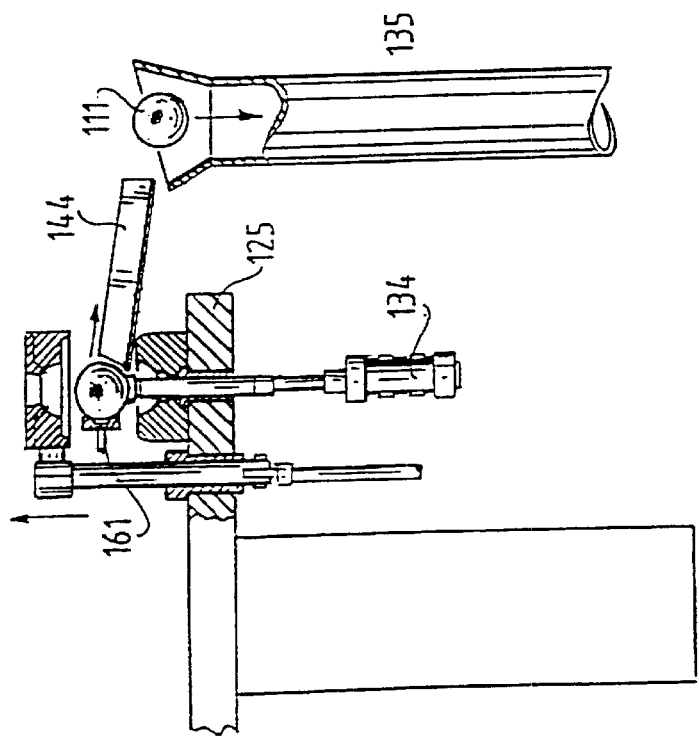

FIG. 11 shows the manner in which the formed round articles 111 can be fed via conduit 135 to rollers 31, 136.

Figure 12:
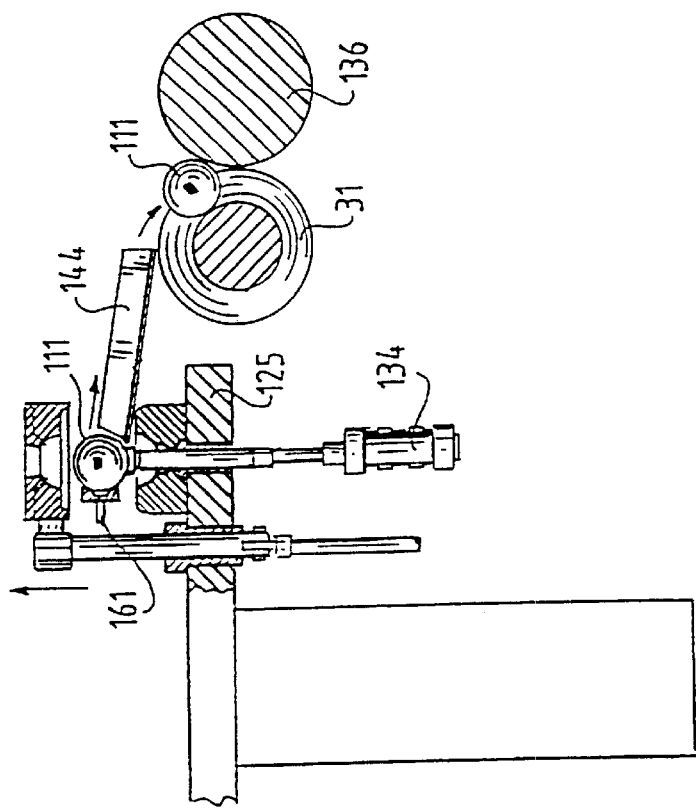

FIG. 12 shows that the still plastic glass articles 111 can also be placed on the interface of rollers 31, 136 without interposing of tube 135 but by making use of a chute 144. Attention is drawn to the presence of an ejector 161 in the embodiment of FIGS. 11 and 12. This serves to remove a formed article 111 from ejector 134 and to push it to chute 144.

Figure 13:
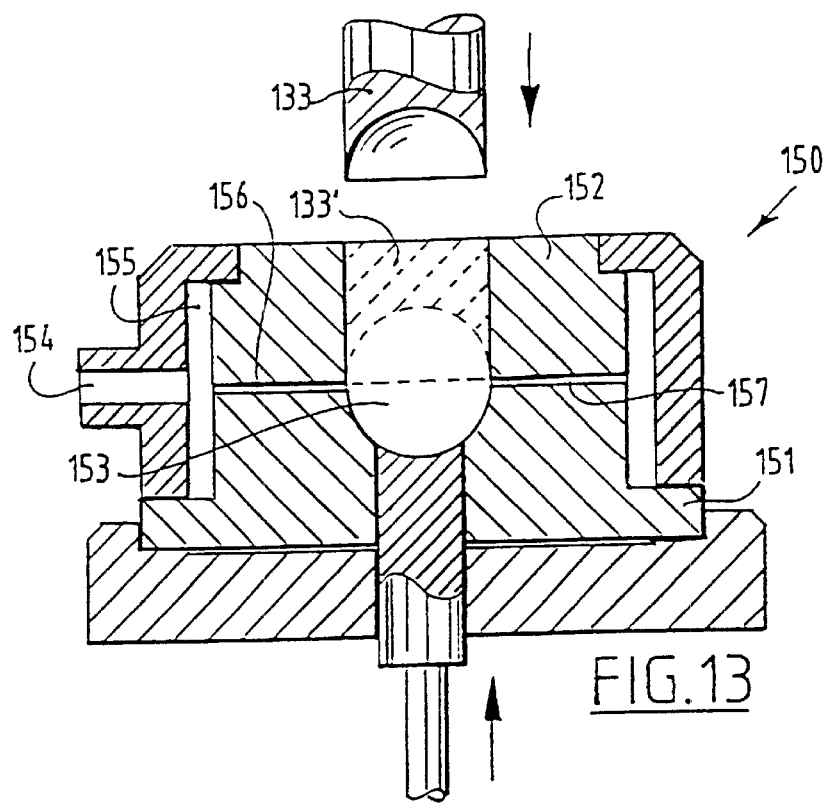
FIG. 13 shows a cross-section through a mould adapted to perform the embedding process in for instance a helium environment.

FIG. 13 shows a mould 150 comprising a bottom 151, a cylindrical part 152 and stamp 133 which together with bottom 151 can bound a spherical cavity 153. Important in this embodiment is the possibility of extracting air from the cavity 153 via a gas passage opening 154, a cylinder jacket-shaped cavity 155 and apertures 156, 157 in order to form an underpressure or to admit a gas soluble in glass, for instance hydrogen, helium, neon, argon or the like. It is important that this provision is operative prior to pouring of the following drop 121 onto the first drop 122. The forming of air bubbles is prevented in this manner.

Figure 14:
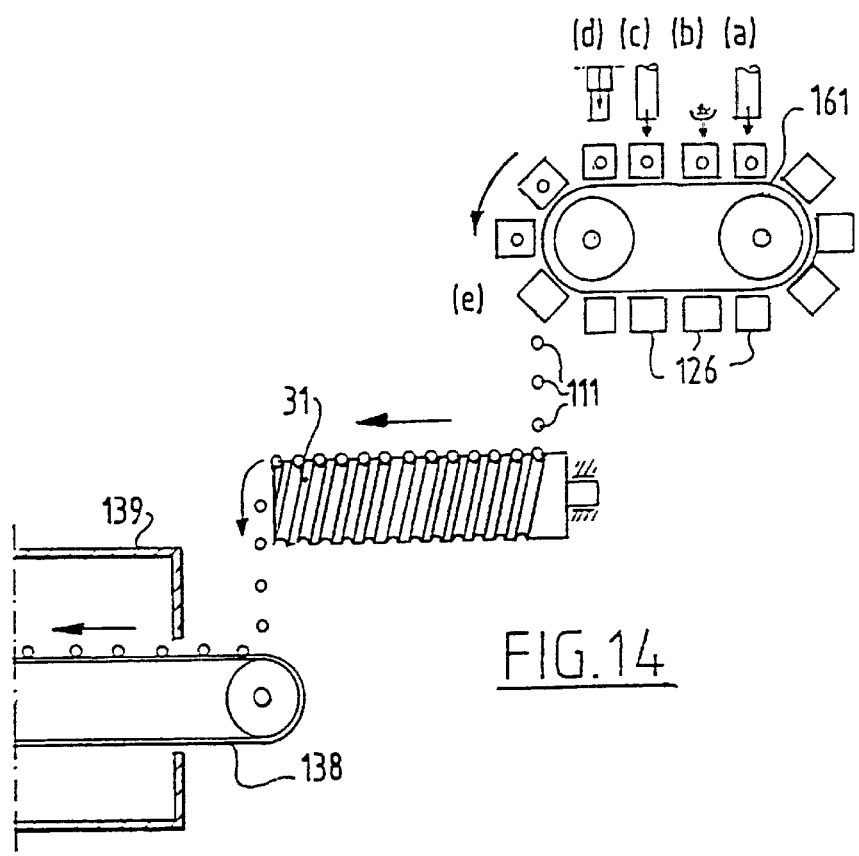
FIG. 14 shows a schematic view of a embodiment in which transporting of the glass articles from the embedding station to the modelling rollers does not take place by ejection but solely by making use of the force of gravity.

FIG. 14 shows an alternative to carrousel 125. Use is made herein of an endless conveyor 161 which carries mould bottoms 126. The treatment stages which are designated respectively with a, b, c, d and e correspond with the production stages on carrousel 125 as according to FIG. 6 and FIGS. 7–12.

As will be apparent, in stage (e) a formed article 111 is deposited on roller 31 under the influence of the force of gravity without interposing of an ejector.

What is claimed is:

1. The method of manufacturing successive spherical glass articles, in each of which is accommodated a figurine, which method comprises the following steps of:
    (a) providing a container with a mass of molten glass, which container comprises a discharge opening which can be closed by a valve and into which a vertical tubular central mandrel extends such that a tubular flow of liquid glass can be delivered via the discharge opening;
    (b) opening the valve for delivering said flow of liquid glass while simultaneously supplying successive figurines intermittently via the mandrel such that these objects are received in a hollow space of the tubular glass flow;
    (c) causing the tubular glass flow to contract and embed the successive objects in the glass mass;
    (d) successively separating the lower part of the tubular glass flow in which a figurine is situated such that still molten glass masses are formed, in each of which a figurine is embedded; and
    (e) modelling these masses to a spherical form by substantially omnidirectional rolling with simultaneous cooling so that the glass solidifies.

2. The method as claimed in claim 1, wherein the mandrel has a widened lower part which can co-act as a valve body with the mouth edge of the discharge opening serving as valve seat.

3. The method as claimed in claim 1, wherein step (c) takes place using a number of concave rollers together bounding a round passage opening.

4. The method as claimed in claim 3, wherein the rollers are driven at an increased peripheral speed reinforcing the contraction of the glass flow.

5. The method as claimed in claim 3, wherein the rollers have partly spherical cavities co-acting in register positions during rotation.

6. The method as claimed in claim 1, wherein step (c) is performed by cutting through the glass flow between the figurines.

7. The method as claimed in claim 6, wherein use is made of two plates with co-acting, generally concave, substantially V-shaped cutting edges.

* * * * *